(12) United States Patent
Koyama

(10) Patent No.: US 7,176,909 B2
(45) Date of Patent: Feb. 13, 2007

(54) COLOR CORRECTION CIRCUIT AND IMAGE DISPLAY APPARATUS INCLUDING THE SAME

(75) Inventor: Fumio Koyama, Shiojiri-si (JP)

(73) Assignee: Seiko Epson Corporation, Tokyo (JP)

( * ) Notice: Subject to any disclaimer, the term of this patent is extended or adjusted under 35 U.S.C. 154(b) by 457 days.

(21) Appl. No.: 10/628,393

(22) Filed: Jul. 29, 2003

(65) Prior Publication Data

US 2004/0104923 A1 Jun. 3, 2004

(30) Foreign Application Priority Data

Aug. 9, 2002 (JP) ............................. 2002-233320

(51) Int. Cl.
*H04N 9/77* (2006.01)
(52) U.S. Cl. ..................... 345/204; 345/213; 345/214; 345/690; 349/5; 353/31; 353/84
(58) Field of Classification Search ................ 345/204, 345/213, 214, 690; 349/5; 353/31, 84
See application file for complete search history.

(56) References Cited

U.S. PATENT DOCUMENTS

| 4,754,321 | A | * | 6/1988 | Srivastava | ................... 348/652 |
| 4,878,756 | A | * | 11/1989 | Stauffer | ....................... 356/406 |
| 4,945,406 | A | * | 7/1990 | Cok | ........................... 358/506 |
| 5,038,216 | A | * | 8/1991 | Easterly et al. | ............. 348/364 |
| 5,216,493 | A | * | 6/1993 | DiBella et al. | .............. 348/655 |
| 5,548,331 | A | * | 8/1996 | Kawahara et al. | ......... 348/243 |
| 5,772,299 | A | * | 6/1998 | Koo et al. | ..................... 353/20 |
| 2002/0044147 | A1 | * | 4/2002 | Martin | ....................... 345/213 |

FOREIGN PATENT DOCUMENTS

| JP | A 06-018841 | 1/1994 |
| JP | A 2002-041000 | 2/2002 |

* cited by examiner

*Primary Examiner*—Bipin Shalwala
*Assistant Examiner*—Vincent E. Kovalick
(74) *Attorney, Agent, or Firm*—Oliff & Berridge, PLC

(57) ABSTRACT

A 2.2th-power to $1^{st}$-power conversion circuit 102 uses a 2.2th-power curve to convert an input R signal 'a' into an R signal 'b' expressed in a $1^{st}$-power signal space. Offsets, which are to be added to a G signal and a B signal, at each tone of the R signal 'b' expressed in the $1^{st}$-power signal space have been stored in advance in a GLUT 112 for R and a BLUT 113 for R. In response to input of the R signal 'b', the GLUT 112 for R and the BLUT 113 for R output the offsets, which are to be added to the G signal and the B signal, according to the tone value of the R signal 'b'. An adder circuit 122 adds offsets 'c' and 'd', which are output from an RLUT 114 for G and an RLUT 116 for B, to the R signal 'b' output from the 2.2th-power to $1^{st}$-power conversion circuit 102, so as to give an R signal 'e'. A $1^{st}$-power to 2.2th-power conversion circuit 132 reversely converts the R signal 'e' according to the 2.2th-power curve. The technique of the invention thus effectively prevents chromaticity coordinates of color rays emitted from a display device from being varied with a variation in tone values of the R, G, and B signals.

4 Claims, 8 Drawing Sheets

COLOR CORRECTION CIRCUIT AND IMAGE DISPLAY APPARATUS INCLUDING THE SAME

BACKGROUND OF THE INVENTION

1. Field of the Invention

The present invention relates to an image display apparatus, such as a liquid crystal projector, and more specifically pertains to a technique of compensating for a variation in chromaticity coordinate of a color ray emitted from a display device with a variation in tone of an input color signal.

2. Description of the Related Art

A three panel-type liquid crystal projector, one of image display apparatuses, has three liquid crystal panels respectively corresponding to three colors R (red), G (green), and B (blue) as display devices. In this liquid crystal projector, illumination light emitted from a lighting optical system is divided into respective color rays R, G, and B, which enter the liquid crystal panels of the corresponding colors. In response to input of each of R, G, and B signals as image signals into the liquid crystal panel of the corresponding color, the liquid crystal panel is actuated to transmit the incident color ray. The R, G, and B transmitted rays (color rays) emitted from the three liquid crystal panels are mixed and are projected on a screen by means of a projection optical system. A resulting color image according to the R, G, and B signals is thus displayed on the screen.

The liquid crystal panel used for the liquid crystal projector varies the wavelength characteristic of the transmitted ray with a variation in tone of the input signal.

For example, the wavelength characteristic of the R color ray transmitted through the R liquid crystal panel is varied with a variation in tone value of the input R signal. The color of the R transmitted ray may thus approach to magenta or to orange. Namely the variation in tone of the R signal results in varying the chromaticity coordinate of the R transmitted ray, which is supposed to be fixed regardless of the varying tone of the R signal.

The similar phenomena are observed in the G liquid crystal panel and the B liquid crystal panel with a variation in tones of the input G signal and B signal.

The liquid crystal projector mixes the R, G, and B transmitted rays by the additive color mixing technique according to the input R, G, and B signals to reproduce the color of an image, on the assumption that the chromaticity coordinates of the R, G, and B transmitted rays (color rays) emitted from the respective liquid crystal panels are not varied with a variation in tones of the R, G, and B signals. The varying chromaticity coordinates of the R, G, and B transmitted rays with a variation in tones of the R, G, and B signals, however, prevent accurate color reproduction of the image according to the input R, G, and B signals.

SUMMARY OF THE INVENTION

The object of the present invention is thus to solve the problem of the prior art technique discussed above and to provide a color correction circuit that compensates for a variation in chromaticity coordinate of a color ray emitted from a display device with a variation in tone of an input color signal.

In order to attain at least part of the above and the other related objects, the present invention is directed to a color correction circuit that is incorporated in an image display apparatus. Here the image display apparatus makes first through third color rays, which respectively correspond to first through third colors, emitted from a display device and mixed in response to first through third color signals corresponding to the first through the third colors, so as to produce a color image. The color correction circuit compensates for a variation in chromaticity coordinate of the first color ray emitted from the display device at least with a variation in tone of the first color signal.

The color correction circuit includes: an offset output module that stores a first offset, which is to be added to the second color signal, and a second offset, which is to be added to the third color signal, at each tone of the first color signal, and outputs the first offset and the second offset according to a tone value of the first color signal; a first adjunction module that adds the first offset output from the offset output module to the second color signal; and a second adjunction module that adds the second offset output from the offset output module to the third color signal.

The first offset and the second offset are set to specific values that cause a chromaticity coordinate of a resulting color ray, which is emitted from the display device and is obtained by mixing the first color ray with a second color ray component and a third color ray component corresponding to the first offset and the second offset, to approach to a preset chromaticity coordinate, regardless of the tone value of the first color signal.

In the color correction circuit of the present invention, the first offset and the second offset according to the tone value of the first color signal are output from the offset output module. The first adjunction module adds the first offset to the second color signal, whereas the second adjunction module adds the second offset to the third color signal. The first color ray emitted from the display device accordingly includes the second color ray component and the third color ray component corresponding to the first offset and the second offset. The resulting color ray has the chromaticity coordinate close to the preset chromaticity coordinate, even when the tone of the first color signal is varied.

The color correction circuit of the present invention makes the chromaticity coordinate of the first color approach to the preset chromaticity coordinate, so as to effectively prevent a variation in color with a variation in tone value of the first color signal.

In one preferable application of the color correction circuit of the present invention, the first adjunction module includes: a first conversion module that converts the second color signal from a signal expressed in a 2.2th-power signal space into a signal expressed in a $1^{st}$-power signal space; a first adder module that adds at least the first offset output from the offset output module to the converted second color signal; and a first reverse conversion module that reversely converts the second color signal after the addition from a signal expressed in the $1^{st}$-power signal space into a signal expressed in the 2.2th-power signal space. The second adjunction module includes: a second conversion module that converts the third color signal from a signal expressed in the 2.2th-power signal space into a signal expressed in the $1^{st}$-power signal space; a second adder module that adds at least the second offset output from the offset output module to the converted third color signal; and a second reverse conversion module that reversely converts the third color signal after the addition from a signal expressed in the $1^{st}$-power signal space into a signal expressed in the 2.2th-power signal space.

Here the signal expressed in the 2.2th-power signal space represents such a signal that the 2.2th-power of the signal is proportional to the output (luminance) of the light emitted from the display device in response to the signal. The signal expressed in the 1st-power signal space represents a similar meaning.

The technique of this application converts the color signal into the signal in the 1st-power signal space and subsequently adds each offset to the converted color signal. This arrangement enables the offset to be added to the color signal in conversion of the light output or luminance without any difficulties.

In another preferable application of the color correction circuit of the invention, the first adjunction module includes: a first slope output module that outputs a slope of a tangent to a 2.2th-power curve according to a tone value of the second color signal; a first multiplier module that multiplies at least the first offset output from the offset output module by the slope output from the first slope output module; and a first adder module that adds the multiplied first offset to the second color signal. The second adjunction module includes: a second slope output module that outputs a slope of a tangent to a 2.2th-power curve according to a tone value of the third color signal; a second multiplier module that multiplies at least the second offset output from the offset output module by the slope output from the second slope output module; and a second adder module that adds the multiplied second offset to the third color signal.

The technique of this application multiplies each offset by the slope of the tangent to the 2.2th-power curve, so as to make the offset substantially equivalent to a signal expressed in the 2.2th-power signal space. This arrangement enables the offset to be readily added to the color signal, without conversion of the color signal from the signal expressed in the 2.2th-power signal space into the signal expressed in the 1st-power signal space.

The technique of the present invention is not restricted to the color correction circuit of the diverse arrangements described above, but is also attained by an image display apparatus including the color correction circuit having any of the above arrangements, as well as by a color correction method.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
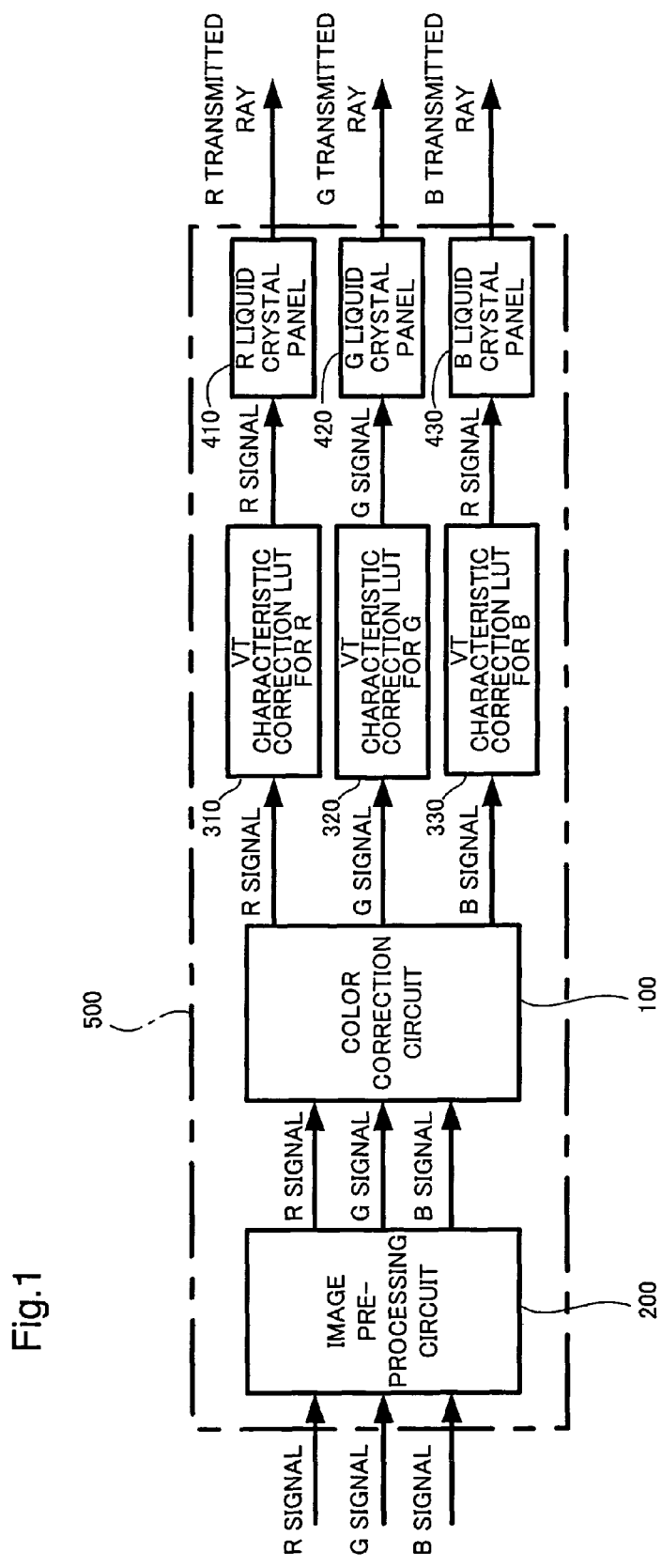
FIG. 1 is a block diagram schematically illustrating the construction of a liquid crystal projector including a color correction circuit of the present invention.

Some modes of carrying out the invention are discussed below as preferred embodiments in the following sequence:
A. General Construction of Liquid Crystal Projector
B. Principle of Color Correction of the Invention
C. First Embodiment
D. Second Embodiment
E. Modifications A. General Construction of Liquid Crystal Projector FIG. 1 is a block diagram schematically illustrating the construction of a liquid crystal projector 500 including a color correction circuit 100 of the present invention. The liquid crystal projector 500 shown in FIG. 1 is a three panel-type and has three liquid crystal panels 410 through 430 respectively corresponding to three colors R (red), G (green), and B (blue) (hereafter referred to as R, G, and B liquid crystal panels) as display devices. The liquid crystal projector 500 also includes an image pre-processing circuit 200, the color correction circuit 100 of the invention, and VT characteristic correction lookup tables (hereafter referred to as LUT) 310 through 330 for R, G, and B.

R, G, and B signals are input as image signals from outside into the image pre-processing circuit 200. When the input image signals are analog signals, the image pre-processing circuit 200 carries out analog-to-digital conversion. The image pre-processing circuit 200 carries out required series of processing according to the format of the input signals, for example, conversion of a frame rate, a resizing process, or superposition of a menu window for menu display. When the input image signal is a composite signal, the image pre-processing circuit 200 demodulates the composite signal and separates R, G, and B signals from a synchronizing signal in the demodulated composite signal.

The color correction circuit 100 makes the R, G, and B signals output from the image pre-processing circuit 200 subject to color correction, so as to prevent the chromaticity coordinates of the colors R, G, and B in the resulting transmitted rays (color rays), which are emitted from the R, G, and B liquid crystal panels 410 through 430, from being varied with a variation in tone values of the R, G, and B signals.

The VT characteristic correction LUTs 310 through 330 for R, G, and B respectively make γ correction of the R, G, and B signals output from the color correction circuit 100 by taking into account VT characteristics (voltage-transmittance characteristics) of the R, G, and B liquid crystal panels 410 through 430. The concrete procedure of the γ correction corrects the voltage levels of the R, G, and B signals to attain a variation in output levels of the transmitted rays from the R, G, and B liquid crystal panels 410 through 430 by γ=2.2-power with a variation in voltage levels of the R, G, and B signals.

The R, G, and B liquid crystal panels 410 through 430 respectively receive the R, G, and B signals output from the VT characteristic correction LUTs 310 through 330 and emit R, G, and B transmitted rays (color rays) based on the input R, G, and B signals. Illumination light emitted from a lighting optical system (not shown) is parted into R, G, and B color rays, which respectively enter the liquid crystal panels 410 through 430 of the corresponding colors. The R, G, and B signals output from the VT characteristic correction LUTs 310 through 330 are input respectively into the liquid crystal panels 410 through 430 of the corresponding colors. Each liquid crystal panel is actuated in response to the input color signal to allow transmission of the incident color ray.

The R, G, and B transmitted rays (color rays) emitted from the R, G, and B liquid crystal panels 410 through 430 are mixed and are projected on a screen (not shown) by means of a projection optical system (not shown). A resulting color image according to the R, G, and B signals is thus displayed on the screen.

B. Principle of Color Correction of the Invention

Figure 2:
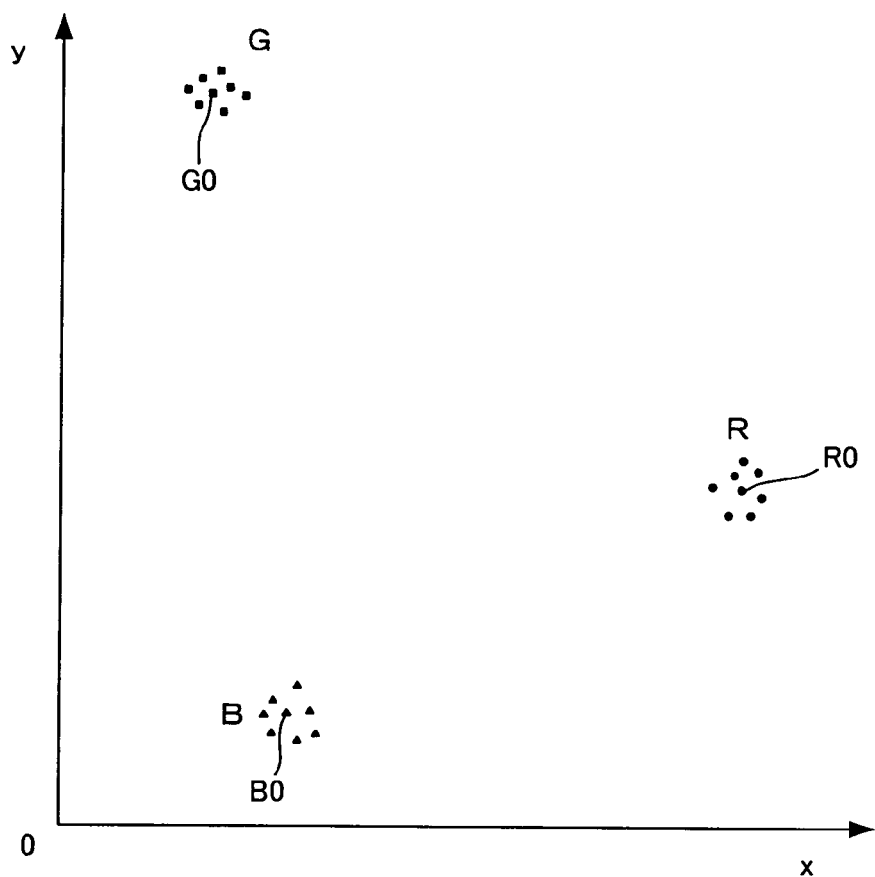
FIG. 2 shows a variation in chromaticity coordinates of transmitted rays emitted from R, G, and B liquid crystal panels with a variation in tones of input R, G, and B signals in a standard liquid crystal projector.

FIG. 2 shows a variation in chromaticity coordinates of transmitted rays emitted from R, G, and B liquid crystal panels with a variation in tones of input R, G, and B signals in a standard liquid crystal projector. The xy chromaticity diagram of FIG. 2 has the x axis as abscissa and the y axis as ordinate.

In the standard liquid crystal projector, for example, in the case of a variation in tone of the R signal, the transmitted ray emitted from the R liquid crystal panel has varying chromaticity coordinates with the variation in tone of the R signal, so as to give multiple dotted chromaticity points as shown by closed circles in the diagram of FIG. 2.

Similarly the transmitted ray emitted from the G liquid crystal panel give multiple dotted chromaticity points as shown by closed squares in the diagram of FIG. 2. The transmitted ray emitted from the B liquid crystal panel give multiple dotted chromaticity points as shown by closed triangles.

The procedure selects one desired chromaticity point among the multiple dotted chromaticity points with regard to each of the colors R, G, and B and specifies the selected chromaticity point as a reference chromaticity point R0, G0, or B0.

Figure 3:
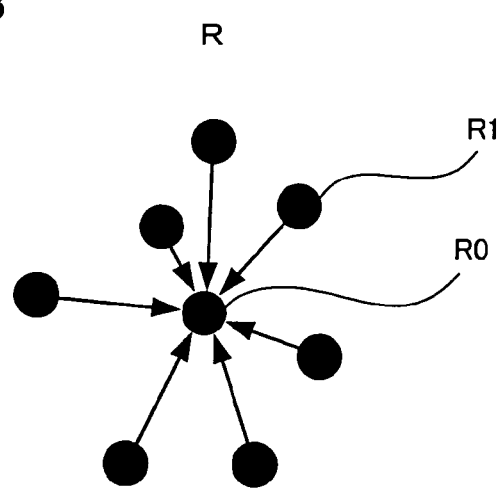
FIG. 3 shows a process of shifting respective dotted chromaticity points with regard to the color R to be close to a reference chromaticity point R0.

With regard to the color R, for example, the procedure then shifts the respective dotted chromaticity points other than the reference chromaticity point R0 to be equivalently close to the position of the reference chromaticity point R0 as shown in FIG. 3. It is naturally desirable that the respective dotted chromaticity points other than the reference chromaticity point R0 equivalently correspond to the position of the reference chromaticity point R0, although such correspondency is not restrictive. Even making the respective dotted chromaticity points sufficiently close to the position of the reference chromaticity point R0 effectively prevents the variation in chromaticity coordinate of the R transmitted ray with a variation in tone of the R signal.

FIG. 3 shows a process of shifting the respective dotted chromaticity points with regard to the color R to be close to the reference chromaticity point R0. For example, when the R signal has a certain tone value r1, the R transmitted ray emitted from the R liquid crystal panel has a chromaticity point R1. The procedure adds adequate offsets to the G signal and the B signal and causes G and B transmitted rays corresponding to the added offsets to be emitted from the G and B liquid crystal panels. The G and B transmitted rays are mixed with the R transmitted ray emitted from the R liquid crystal panel. The chromaticity coordinate of the color R in the resulting transmitted ray approaches to the chromaticity coordinate of the reference chromaticity point R0. In this manner, the process shifts the chromaticity point R1 of the R transmitted ray at the tone value r1 of the R signal to be equivalently close to the position of the reference chromaticity point R0.

The arrangement of shifting the dotted chromaticity points at each tone of the R signal to be equivalently close to the position of the reference chromaticity point R0 effectively prevents the variation in chromaticity coordinate of the color R with a variation in tone of the R signal.

Similarly the procedure shifts dotted chromaticity points at each tone of the G signal or the B signal to be equivalently close to the position of the corresponding reference chromaticity point G0 or B0. This arrangement effectively prevents the variation in chromaticity coordinate of the color G or B with a variation in tone of the G signal or the B signal.

As discussed previously, it is naturally desirable that the chromaticity coordinates of the R, G, and B transmitted rays respectively correspond to the reference chromaticity points R0, G0, and B0. Such correspondency, however, required iterative corrections in the case of a variation in tones of multiple colors. This undesirably complicates the operation. The arrangement of shifting the dotted chromaticity points not to be identical with but to be close to the position of the corresponding reference chromaticity point R0, G0, or B0 still effectively prevents the variation in chromaticity coordinate of each color by the desirably simplified operation.

In one example, it is assumed that the varying tones of the R, G, and B signals change the color displayed by a certain projector from a white having a color temperature of 7500 K to a white having a color temperature of 8000 K. Adjusting the R, G, and B signals to R: 100% (unchanged), G: 98%, and B: 96% returns the white having the color temperature of 8000 K to the white having the color temperature of 7500 K. Even in the case of a variation in tones of multiple colors, this method makes a correction of only several percents of the original value of each color signal and thereby does not have any significant effects on the chromaticity coordinate of each transmitted color ray.

Figure 4:
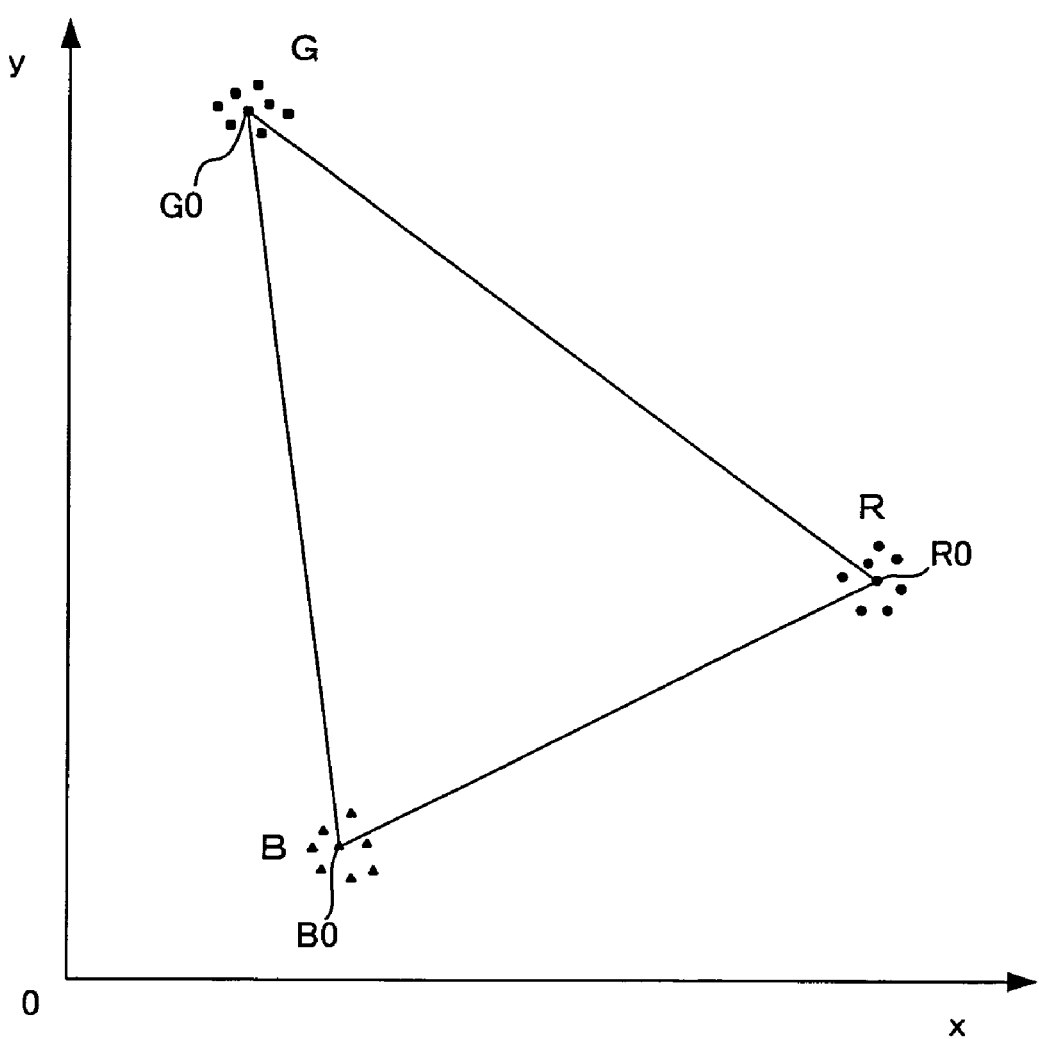
FIG. 4 shows an expressible color range defined by reference chromaticity points R0, G0, and B0.

FIG. 4 shows an expressible color range defined by the reference chromaticity points R0, G0, and B0.

The color correction described above enables the liquid crystal projector to equivalently express the colors of each image in the triangular color range of the reference chromaticity points R0, G0, and B0 shown in FIG. 4.

C. First Embodiment

Figure 5:
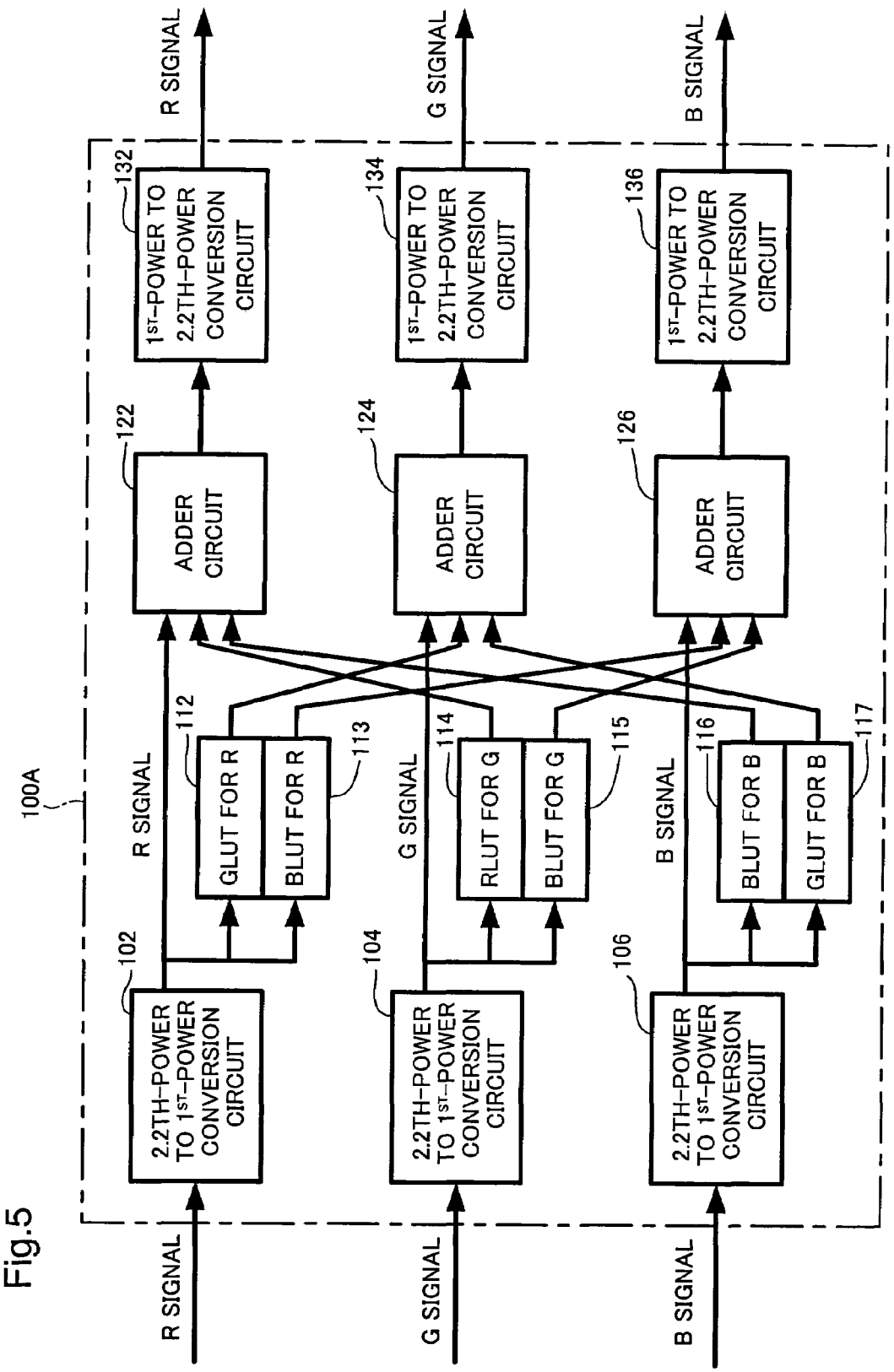
FIG. 5 is a block diagram showing the structure of a color correction circuit in a first embodiment of the present invention.

FIG. 5 is a block diagram showing the structure of a color correction circuit 100A in a first embodiment of the present invention. The color correction circuit 100A of the first embodiment is divided into three circuit sections corresponding to the three colors R, G, and B as shown in FIG. 5. The R circuit section includes a 2.2th-power to $1^{st}$-power conversion circuit 102, a GLUT 112 for R, a BLUT 113 for R, an adder circuit 122, and a $1^{st}$-power to 2.2th-power conversion circuit 132. Similarly the G circuit section includes a 2.2th-power to $1^{st}$-power conversion circuit 104, an RLUT 114 for G, a BLUT 115 for G, an adder circuit 124, and a $1^{st}$-power to 2.2th-power conversion circuit 134. The B circuit section includes a 2.2th-power to $1^{st}$-power conversion circuit 106, an RLUT 116 for B, a GLUT 117 for B, an adder circuit 126, and a $1^{st}$-power to 2.2th-power conversion circuit 136.

The LUTs 112 through 117 correspond to the offset output module of the present invention. The 2.2th-power to $1^{st}$-power conversion circuits 102, 104, and 106, the $1^{st}$-power to 2.2th-power conversion circuits 132, 134, and 136, and the adder circuits 122, 124, and 126 respectively correspond to the conversion module, the reverse conversion module, and the adder module of the present invention. The 2.2th-power to $1^{st}$-power conversion circuit, the adder circuit, and the $1^{st}$-power to 2.2th-power conversion circuit in combination constitute the adjunction module of the present invention.

All the R, G, and B circuit sections operate similarly. The following thus describes the operations of the R circuit section as an example.

Figure 6A:
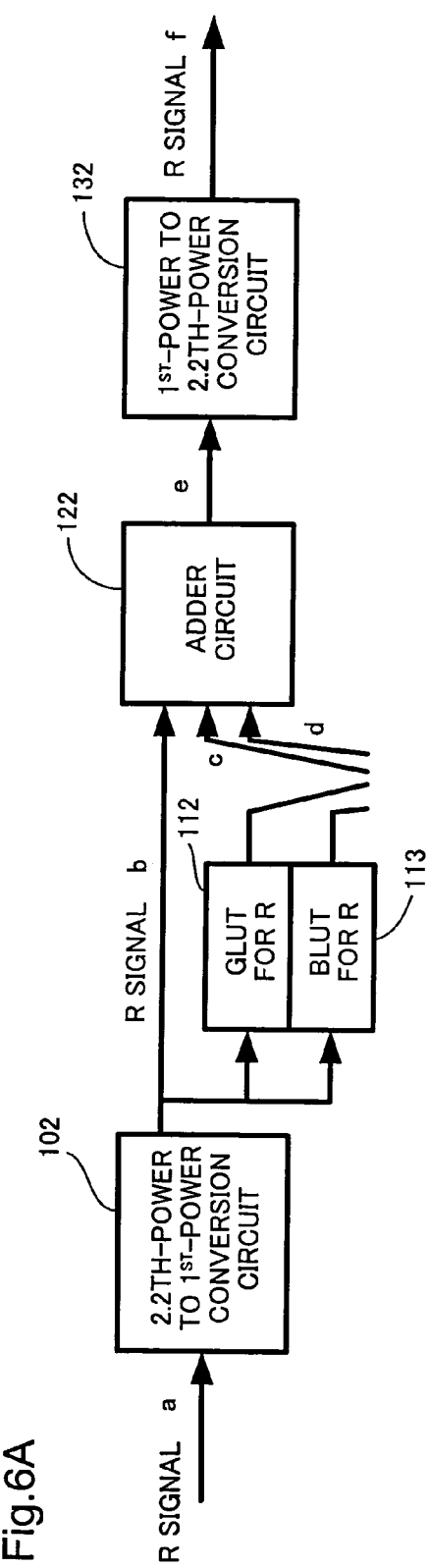
FIGS. 6A and 6B show the operations of an R circuit section included in the color correction circuit of FIG. 5.
Figure 6B:
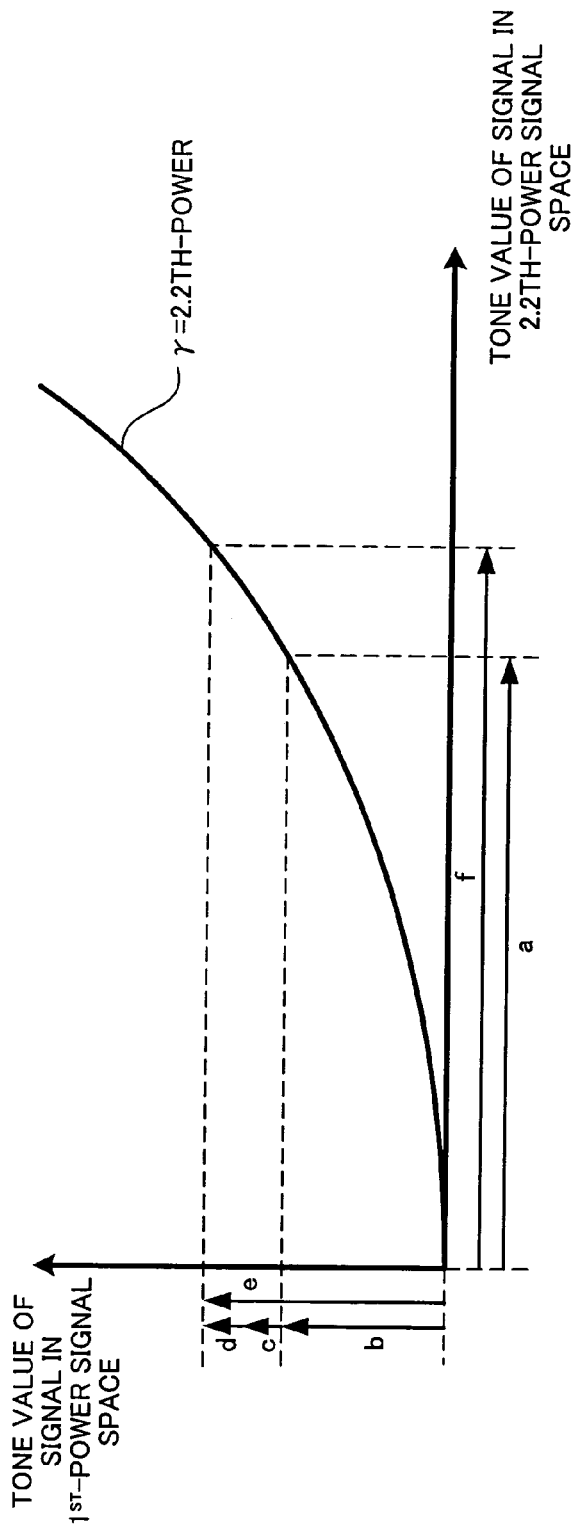

FIGS. 6A and 6B show the operations of the R circuit section included in the color correction circuit 100A of FIG. 5. FIG. 6A shows essential signals in the R circuit section, and FIG. 6B shows the relation of the essential signals. A solid curve in FIG. 6B represents a curve of γ=2.2th-power.

An input R signal 'a' is expressed in a 2.2th-power signal space and is thus not proportional to the output (the luminance) of the transmitted ray emitted from the R liquid crystal panel 410. The 2.2th-power to $1^{st}$-power conversion circuit 102 thus uses the γ=2.2th-power curve shown in FIG. 6B to convert the input R signal 'a' into an R signal 'b' in a $1^{st}$-power signal space. The obtained R signal 'b' is proportional to the luminance of the transmitted ray emitted from the R liquid crystal panel 410.

Offsets to be added to the G signal and the B signal with regard to each tone of the R signal 'b' in the $1^{st}$-power signal space have been stored in advance in the GLUT 112 for R and the BLUT 113 for R. These offsets are also signals expressed in the $1^{st}$-power signal space.

The R transmitted ray emitted from the R liquid crystal panel 410 in response to the R signal 'b' having a certain tone value is mixed with the G and B transmitted rays respectively emitted from the G and B liquid crystal panels 420 and 430, so as to make the chromaticity coordinate of the color R in the resulting transmitted ray correspond to the chromaticity coordinate of the preset reference chromaticity point R0. The offsets to be added to the G signal and the B signal to attain such correspondency have been stored in the GLUT 112 for R and the BLUT 113 for R.

Adequate offsets for such purpose have also been stored in the RLUT 114 for G and the BLUT 115 for G included in the G circuit section and in the RLUT 116 for B and the GLUT 117 for B included in the B circuit section. Each offset may take a positive value or a negative value.

In response to input of the R signal 'b', the GLUT 112 for R and the BLUT 113 for R respectively output the offsets, which are to be added to the G signal and the B signal, according to the tone of the R signal 'b'. The output offset to be added to the G signal enters the G adder circuit 124, whereas the output offset to be added to the B signal enters the B adder circuit 126, as shown in FIG. 5.

In a similar manner, an offset 'c' output from the RLUT 114 for G to be added to the R signal and an offset 'd' output from the RLUT 116 for B to be added to the R signal enter the R adder circuit 122.

The adder circuit 122 adds the input offset 'c' from the RLUT 114 for G and the input offset 'd' from the RLUT 116 for B to the R signal 'b'input from the 2.2th-power to $1^{st}$-power conversion circuit 102 and outputs a resulting R signal 'e'. The R signal 'b' and the offsets 'c' and 'd' are all expressed in the $1^{st}$-power signal space and are thus easily summed up by light output conversion or luminance conversion. The resulting R signal 'e'is thus naturally expressed in the $1^{st}$-power signal space.

The $1^{st}$-power to 2.2th-power conversion circuit 132 uses the γ=2.2th-power curve of FIG. 6(B) to carry out reverse conversion and thereby return the R signal 'e' in the $1^{st}$-power signal space into a signal in the original 2.2th-power signal space. A resulting R signal 'f' expressed in the 2.2th-power signal space is accordingly output from the $1^{st}$-power to 2.2th-power conversion circuit 132.

The 2.2th-power to $1^{st}$-power conversion circuit 102 and the $1^{st}$-power to 2.2th-power conversion circuit 132 may be constructed by LUTs or otherwise by arithmetic circuits. Such construction is also applied to the 2.2th-power to $1^{st}$-power conversion circuit 104 and the $1^{st}$-power to 2.2th-power conversion circuit 134 included in the G circuit section and to the 2.2th-power to $1^{st}$-power conversion circuit 106 and the $1^{st}$-power to 2.2th-power conversion circuit 136 included in the B circuit section.

As mentioned previously, the operations of the R circuit section discussed above are applicable to the operations of the G circuit section and the B circuit section.

The technique of the embodiment described above adds the offsets, which have been stored in advance in the GLUT 112 for R and the BLUT 113 for R, to the G signal and the B signal in response to a variation in tone of the R signal. The chromaticity coordinate of the color R in the resulting transmitted ray accordingly approaches to the chromaticity coordinate of the reference chromaticity point R0, regardless of the tone variation of the R signal.

In a similar manner, the technique of the embodiment adds the offsets, which have been stored in advance in the RLUT 114 for G and the BLUT 115 for G, to the R signal and the B signal in response to a variation in tone of the G signal. The chromaticity coordinate of the color G in the resulting transmitted ray accordingly approaches to the chromaticity coordinate of the reference chromaticity point G0, regardless of the tone variation of the G signal. The technique of the embodiment also adds the offsets, which have been stored in advance in the RLUT 116 for B and the GLUT 117 for B, to the R signal and the G signal in response to a variation in tone of the B signal. The chromaticity coordinate of the color B in the resulting transmitted ray accordingly approaches to the chromaticity coordinate of the reference chromaticity point B0, regardless of the tone variation of the B signal.

The liquid crystal projector 500 including the color correction circuit 100A of the first embodiment ensures the accurate color reproduction of an image according to the R, G, and B signals.

D. Second Embodiment

Figure 7:
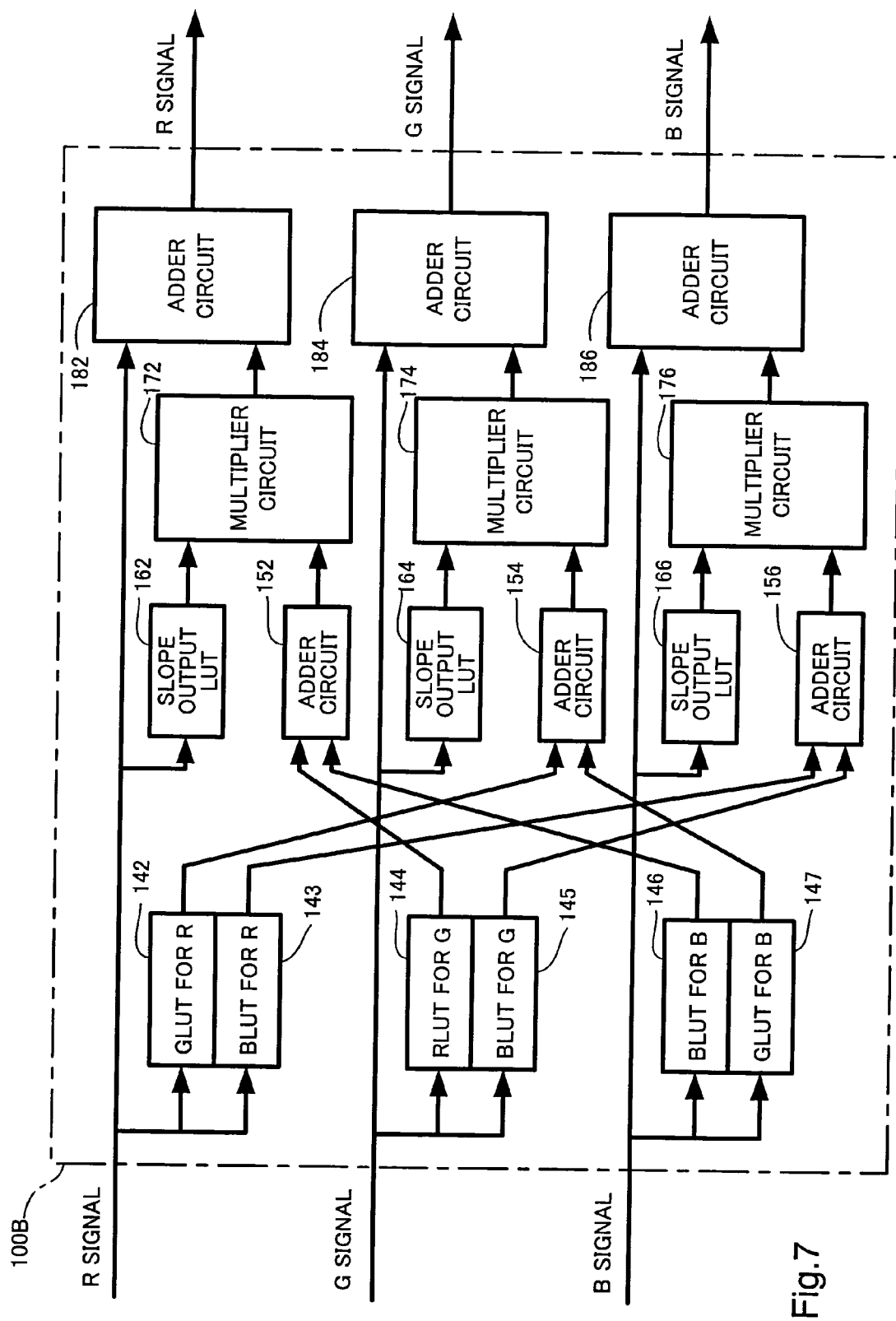
FIG. 7 is a block diagram showing the structure of another color correction circuit in a second embodiment of the present invention.

FIG. 7 is a block diagram showing the structure of another color correction circuit 100B in a second embodiment of the present invention. The color correction circuit 100B of the second embodiment is also divided into three circuit sections corresponding to the three colors R, G, and B as shown in FIG. 7. The R circuit section includes a GLUT 142 for R, a BLUT 143 for R, an adder circuit 152, a slope output LUT 162, a multiplier circuit 172, and another adder circuit 182. Similarly the G circuit section includes an RLUT 144 for G, a BLUT 145 for G, an adder circuit 154, a slope output LUT 164, a multiplier circuit 174, and another adder circuit 184. The B circuit section includes an RLUT 146 for B, a GLUT 147 for B, an adder circuit 156, a slope output LUT 166, a multiplier circuit 176, and another adder circuit 186.

The LUTs 142 through 147 correspond to the offset output module of the present invention. The slope output LUTs 162, 164, and 166, the multiplier circuits 172, 174, and 176, and the adder circuits 182, 184, and 186 respectively correspond to the slope output module, the multiplier module, and the adder module of the present invention. The slope output LUT, the multiplier circuit, and the adder circuit in combination constitute the adjunction module of the present invention.

All the R, G, and B circuit sections operate similarly. The following thus describes the operations of the R circuit section as an example.

Figure 8A:
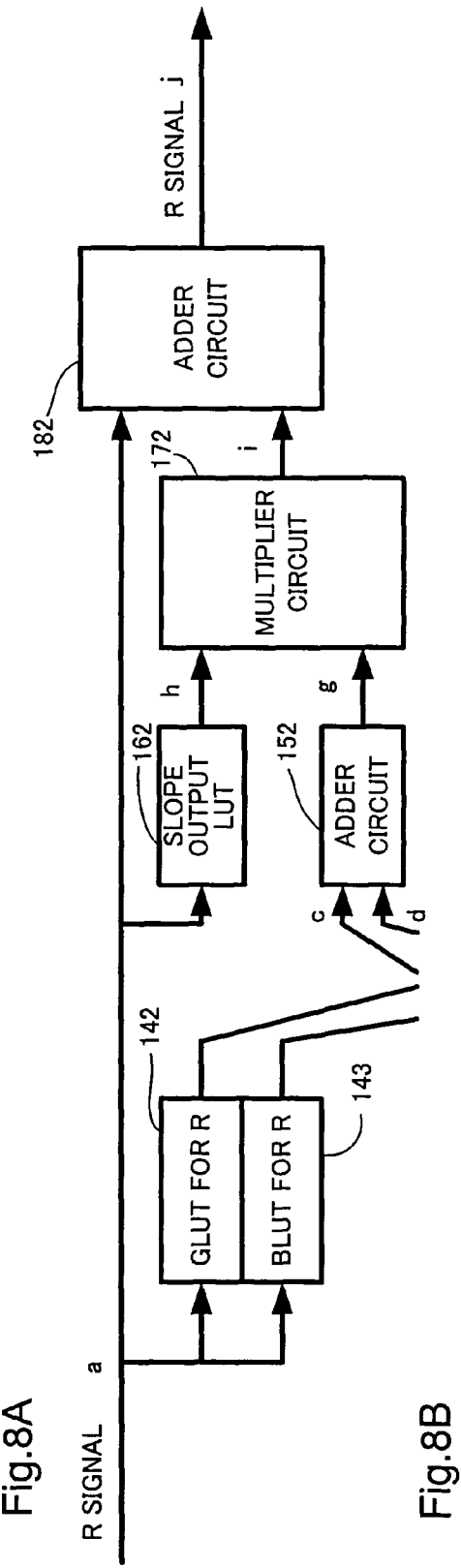
FIGS. 8A and 8B show the operations of an R circuit section included in the color correction circuit of FIG. 7.
Figure 8B:
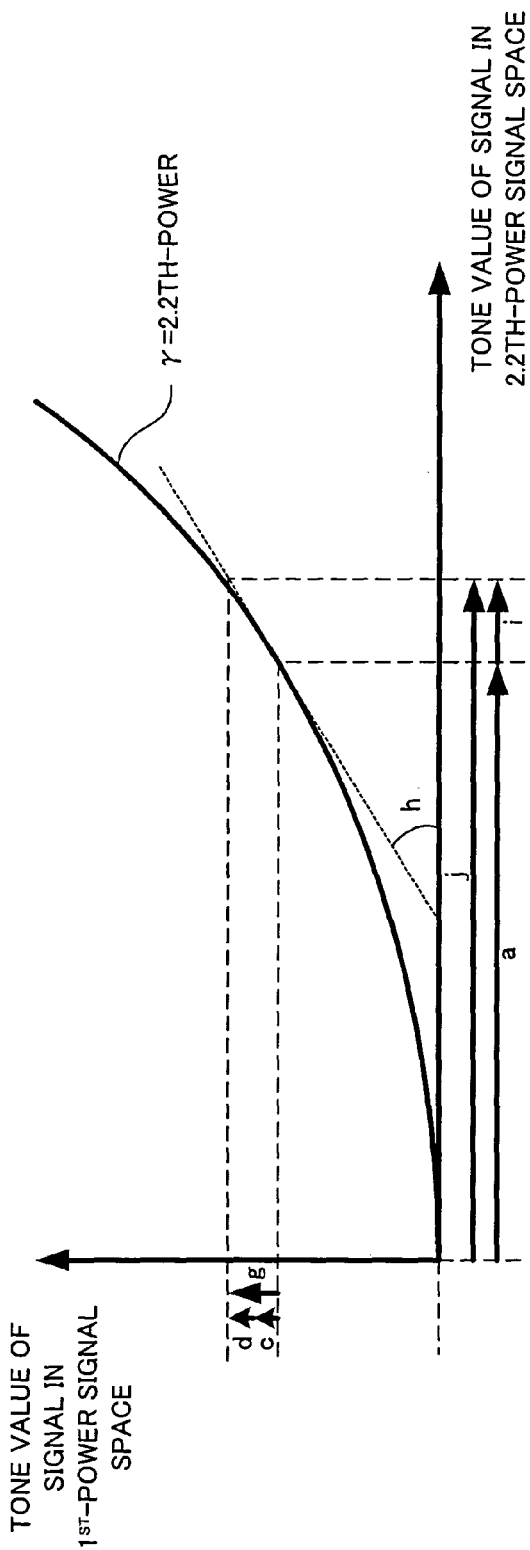

FIGS. 8A and 8B show the operations of the R circuit section included in the color correction circuit 100B of FIG. 7. FIG. 8A shows essential signals in the R circuit section, and FIG. 8B shows the relation of the essential signals. A solid curve in FIG. 8B represents a curve of γ=2.2th-power.

The input R signal 'a' in the second embodiment is also expressed in the 2.2th-power signal space but is used without the conversion unlike the procedure of the first embodiment.

Offsets to be added to the G signal and the B signal with regard to each tone of the R signal 'a' in the 2.2th-power signal space have been stored in advance in the GLUT 142 for R and the BLUT 143 for R. These offsets are signals expressed not in the 2.2th-power signal space but in the $1^{st}$-power signal space.

The R transmitted ray emitted from the R liquid crystal panel 410 in response to the R signal 'a' in the 2.2th-power signal space having a certain tone value is mixed with the G and B transmitted rays respectively emitted from the G and B liquid crystal panels 420 and 430, so as to make the chromaticity coordinate of the color R in the resulting transmitted ray correspond to the chromaticity coordinate of the preset reference chromaticity point R0. The offsets to be added to the G signal and the B signal to attain such correspondency have been stored in the GLUT 142 for R and the BLUT 143 for R.

Adequate offsets for such purpose have also been stored in the RLUT 144 for G and the BLUT 145 for G included in the G circuit section and in the RLUT 146 for B and the GLUT 147 for B included in the B circuit section. Each offset may take a positive value or a negative value.

In response to input of the R signal 'a', the GLUT 142 for R and the BLUT 143 for R respectively output the offsets, which are to be added to the G signal and the B signal, according to the tone of the R signal 'a'. The output offset to be added to the G signal enters the G adder circuit 154, whereas the output offset to be added to the B signal enters the B adder circuit 156, as shown in FIG. 7.

In a similar manner, an offset 'c' output from the RLUT 144 for G to be added to the R signal and an offset 'd' output from the RLUT 146 for .B to be added to the R signal enter the R adder circuit 152.

The adder circuit 152 sums up the input offset 'c' from the RLUT 144 for G and the input offset 'd' from the RLUT 146 for B to give a total offset output 'g'. The offsets 'c' and 'd' are expressed in the $1^{st}$-power signal space and are thus summed up by light output conversion or luminance conversion. The total offset output 'g' is thus naturally a signal expressed in the $1^{st}$-power signal space.

Addition of the total offset output 'g' expressed in the $1^{st}$-power signal space to the input R signal 'a' expressed in the 2.2th-power signal space is not allowed. The procedure of the second embodiment utilizes the slope of a tangent to the 2.2th-power curve shown in FIG. 8B to convert the total offset output 'g' expressed into the $1^{st}$-power signal space into a signal expressed in the 2.2th-power signal space.

Slopes of the tangent to the 2.2th-power curve at the respective tone values of the R signal 'a' expressed in the 2.2th-power signal space have been stored in advance in the slope output LUT 162. Such slopes have also been stored in the slope output LUT 164 included in the G circuit section and in the slope output LUT 166 included in the B circuit section.

In response to input of the R signal 'a', the slope output LUT 162 outputs a slope 'h' of the tangent to the 2.2th-power curve at the tone value of the input R signal 'a'.

The multiplier circuit 172 multiplies the total offset output 'g' output from the adder circuit 152 by the slope 'h' output from the slope output LUT 162, so as to calculate a resulting total offset output 'i' (=g×h), which is a signal expressed in the 2.2th-power signal space. The resulting total offset output 'i' is substantially equivalent to a signal in the 2.2th-power signal space obtained by conversion of the total offset output 'g' expressed in the $1^{st}$-power signal space.

The resulting total offset output 'i', which is equivalent to the signal expressed in the 2.2th-power signal space, is addable to the input R signal 'a' expressed in the 2.2th-power signal space.

The adder circuit 182 then adds the resulting total offset output 'i' output from the multiplier circuit 172 to the input R signal 'a', so as to give an R signal 'j' in the 2.2th-power signal space.

As mentioned previously, the operations of the R circuit section discussed above are applicable to the operations of the G circuit section and the B circuit section.

The technique of the second embodiment described above adds the offsets, which have been stored in advance in the GLUT 142 for R and the BLUT 143 for R, to the G signal and the B signal in response to a variation in tone of the R signal. The chromaticity coordinate of the color R in the resulting transmitted ray accordingly approaches to the chromaticity coordinate of the reference chromaticity point R0, regardless of the tone variation of the R signal.

In a similar manner, the technique of the embodiment adds the offsets, which have been stored in advance in the RLUT 144 for G and the BLUT 145 for G, to the R signal and the B signal in response to a variation in tone of the G signal. The chromaticity coordinate of the color G in the resulting transmitted ray accordingly approaches to the chromaticity coordinate of the reference chromaticity point G0, regardless of the tone variation of the G signal. The technique of the embodiment also adds the offsets, which have been stored in advance in the RLUT 146 for B and the GLUT 147 for B, to the R signal and the G signal in response to a variation in tone of the B signal. The chromaticity coordinate of the color B in the resulting transmitted ray accordingly approaches to the chromaticity coordinate of the reference chromaticity point B0, regardless of the tone variation of the B signal.

The liquid crystal projector 500 including the color correction circuit 100B of the second embodiment ensures the accurate color reproduction of an image according to the R, G, and B signals.

E. Modifications

The above embodiments are to be considered in all aspects as illustrative and not restrictive. There may be many modifications, changes, and alterations without departing from the scope or spirit of the main characteristics of the present invention.

The color correction circuit 100A of the first embodiment discussed above has the $1^{st}$-power to 2.2th-power conversion circuit 132 in the R circuit section to convert the R signal 'e' expressed in the $1^{st}$-power signal space back to a signal expressed in the original 2.2th-power signal space. In one modified structure, the $1^{st}$-power to 2.2th-power conversion circuit 132 may be combined with the subsequent VT characteristic LUT 310 and constructed by one common LUT. This modified structure is also applicable to the $1^{st}$-power to 2.2th-power conversion circuit 134 included in the G circuit section and to the $1^{st}$-power to 2.2th-power conversion circuit 136 included in the B circuit section.

In the color correction circuit 100A of the first embodiment discussed above, the GLUT 112 for R and the BLUT 113 for R in the R circuit section receive the R signal 'b' output from the 2.2th-power to $1^{st}$-power conversion circuit 102. In one modified structure, the GLUT 112 for R and the BLUT 113 for R may receive the R signal 'a', which is input into the 2.2th-power to $1^{st}$-power conversion circuit 102 (that is, the signal expressed in the 2.2th-power signal space). In this modified structure, the offsets stored in the GLUT 112 for R and the BLUT 113 for R may be identical with the offsets stored in the GLUT 142 for R and in the BLUT 143 for R in the structure of the second embodiment. This modified structure is also applicable to the RLUT 114 for G and the BLUT 115 for G included in the G circuit section and to the RLUT 116 for B and the GLUT 117 for B included in the B circuit section.

The color correction circuit 100A of the first embodiment discussed above includes the 2.2th-power to $1^{st}$-power conversion circuits 102, 104, and 106, the LUTs 112 through 117 for storing offsets, the adder circuits 122, 124, and 126, and the $1^{st}$-power to 2.2th-power conversion circuits 132, 134, and 136. These constituents may be attained by a three-dimensional LUT.

The three-dimensional LUT is constructed, for example, by a RAM, and the R, G, and B signals are input as an address of the RAM. When each of the R, G, and B signals is an 8-bit signal, the address has 24 bits. In one example, the $0^{th}$ bit to the $7^{th}$ bit of the address, the $8^{th}$ bit to the $15^{th}$ bit of the address, and the $16^{th}$ bit to the $23^{rd}$ bit of the address are allocated respectively to the $0^{th}$ bit to the $7^{th}$ bit of the R signal, to the $0^{th}$ bit to the $7^{th}$ bit of the G signal, and to the $0^{th}$ bit to the $7^{th}$ bit of the B signal. A preset combination of tone values of color-corrected R, G, and B signals is stored at each address defined by the combination of the tone values of the original R, G, and B signals. One available example is a combination of the tones of the R, G, and B signals output from the color correction circuit 100A of the first embodiment.

This modified structure, however, requires the RAM having the capacity of storing $24^{th}$ power of 2 addresses and accordingly gives a greater circuit scale, compared with the first and the second embodiments.

The procedure described above selects the chromaticity points shown in FIG. 2 for the reference chromaticity points R0, G0, and B0. As stated above, negative values may be set to the offsets to be added to the G signal and the B signal, in order to make the chromaticity point of the color R approach to the position of the reference chromaticity point R0 in response to the R signal having a certain tone value. Any of the R signal, the G signal, and the B signal naturally can not take a negative tone value. In the case where the tone values of the original G signal and the B signal are equal to 0, addition of the negative offsets to the G signal and the B signal does not change the tone values of the G signal and the B signal but keeps them equal to 0. The chromaticity point of the color R can thus not approach to the position of the reference chromaticity point R0. This problem also arises for the other colors G and B.

In order to make the chromaticity points of the respective colors R, G, and B approach to the reference chromaticity points R0, G0, and B0, regardless of the tone values of the R, G, and B signals, the following method may be adopted to select the reference chromaticity points R0, G0, and B0.

Figure 9:
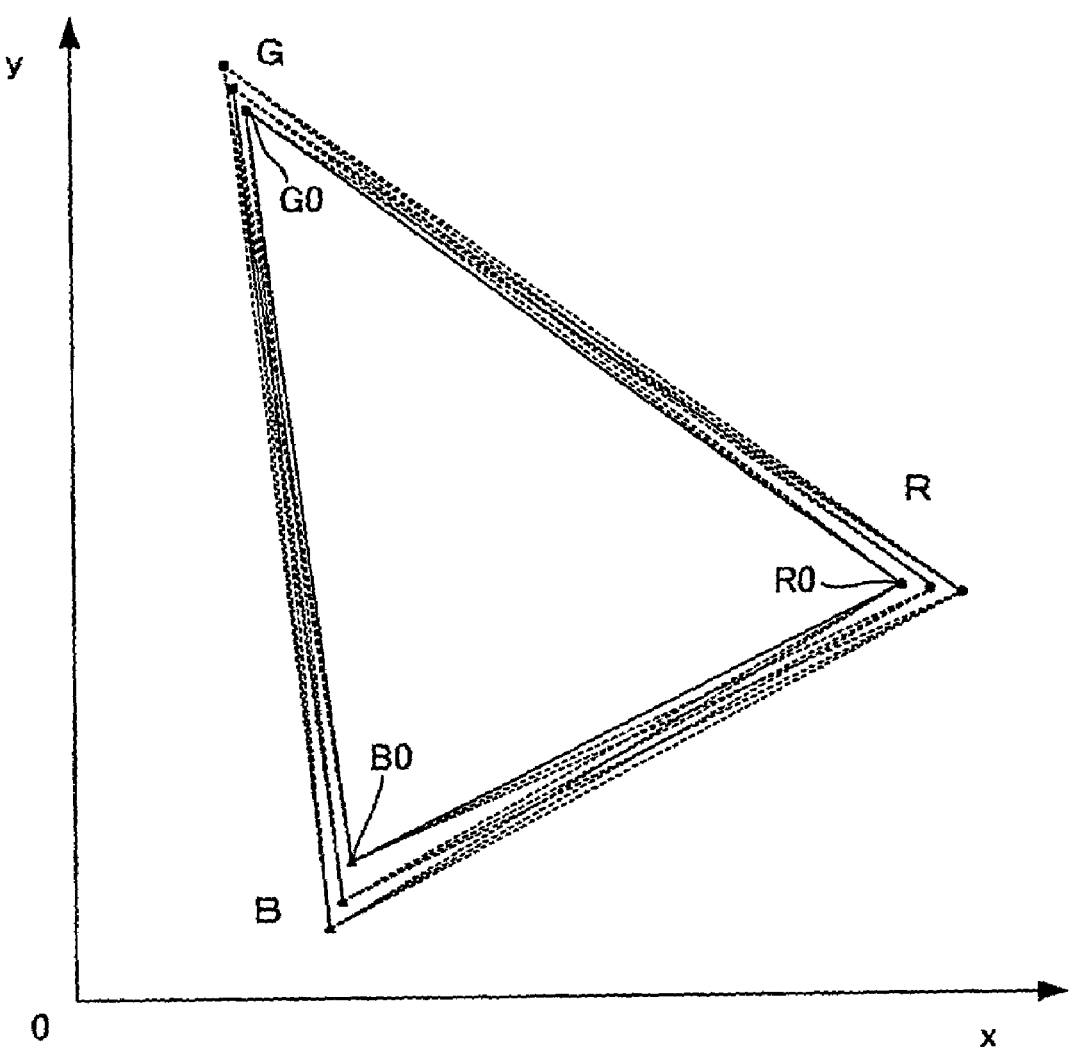
FIG. 9 shows one method of selecting the reference chromaticity points.

FIG. 9 shows one method of selecting the reference chromaticity points. For the better understanding, it is assumed that each of the R, G, and B signals may take three levels of the tone value (tone 0, tone 1, and tone 2). The transmitted ray emitted from each of the R, G, and B liquid crystal panels has three dotted chromaticity points according to the respective levels (tone 0, tone 1, tone 2) of the R signal, the G signal, or the B signal as shown in FIG. 9.

A triangle is specified by each combination of selected R, G, and B chromaticity points as three vertexes. Such triangles are formed regard to all the possible combinations of the R, G, and B chromaticity points. The triangle located at an inner-most position (a solid triangle in the example of FIG. 9) is then extracted among all the triangles. The R, G, and B chromaticity points as the three vertexes of the extracted triangle are selected for the reference chromaticity points R0, G0, and B0.

Selection of the reference chromaticity points R0, G0, and B0 in this manner causes only positive values to be set to the offsets to be added to the G signal and the B signal, in order to make the chromaticity point of the color R approach to the position of the reference chromaticity point R0 in response to the R signal having a certain tone value. Even when the tone values of the original G signal and B signal are equal to 0, the offsets can be added to the G signal and the B signal to make the chromaticity point of the color R approach to the position of the reference chromaticity point R0. This arrangement also ensures such approach with regard to the chromaticity points of the other colors G and B.

The scope and spirit of the present invention are indicated by the appended claims, rather than by the foregoing description.

What is claimed is:

1. A color correction circuit that is incorporated in an image display apparatus, the image display apparatus making first through third color rays, which respectively correspond to first through third colors, emitted from a display device and mixed in response to first through third color signals corresponding to the first through the third colors, so as to produce a color image, the color correction circuit compensating for a variation in chromaticity coordinate of the first color ray emitted from the display device at least with a variation in tone of the first color signal, the color correction circuit comprising:

an offset output module that stores a first offset, which is to be added to the second color signal, and a second offset, which is to be added to the third color signal, at each tone of the first color signal, and outputs the first offset and the second offset according to a tone value of the first color signal;

a first adjunction module that adds the first offset output from the offset output module to the second color signal; and a second adjunction module that adds the second offset output from the offset output module to the third color signal, wherein the first offset and the second offset are set to specific values that cause a chromaticity coordinate of a resulting color ray, which is emitted from the display device and is obtained by mixing the first color ray with a second color ray component and a third color ray component corresponding to the first offset and the second offset, to approach to a preset chromaticity coordinate, regardless of the tone value of the first color signal, wherein the first adjunction module comprises:

a first conversion module that converts the second color signal from a signal expressed in a 2.2th-power signal space into a signal expressed in a $1^{st}$-power signal space;

a first adder module that adds at least the first offset output from the offset output module to the converted second color signal; and a first reverse conversion module that reversely converts the second color signal after the addition from a signal expressed in the $1^{st}$-power signal space into a signal expressed in the 2.2th-power signal space, the second adjunction module comprising:

a second conversion module that converts the third color signal from a signal expressed in the 2.2th-power signal space into a signal expressed in the $1^{st}$-power signal space;

a second adder module that adds at least the second offset output from the offset output module to the converted third color signal; and a second reverse conversion module that reversely converts the third color signal after the addition from a signal expressed in the $1^{st}$-power signal space into a signal expressed in the 2.2th-power signal space.

2. An image display apparatus, comprising a color correction circuit in accordance with claim 1.

3. A color correction circuit that is incorporated in an image display apparatus, the image display apparatus making first through third color rays, which respectively correspond to first through third colors, emitted from a display device and mixed in response to first through third color signals corresponding to the first through the third colors, so as to produce a color image, the color correction circuit compensating for a variation in chromaticity coordinate of the first color ray emitted from the display device at least with a variation in tone of the first color signal, the color correction circuit comprising:

an offset output module that stores a first offset, which is to be added to the second color signal, and a second offset, which is to be added to the third color signal, at each tone of the first color signal, and outputs the first offset and the second offset according to a tone value of the first color signal;

a first adjunction module that adds the first offset output from the offset output module to the second color signal; and a second adjunction module that adds the second offset output from the offset output module to the third color signal, wherein the first offset and the second offset are set to specific values that cause a chromaticity coordinate of a resulting color ray, which is emitted from the display device and is obtained by mixing the first color ray with a second color ray component and a third color ray component corresponding to the first offset and the second offset, to approach to a preset chromaticity coordinate, regardless of the tone value of the first color signal, wherein the first adjunction module comprises:

a first slope output module that outputs a slope of a tangent to a 2.2th-power curve according to a tone value of the second color signal;

a first multiplier module that multiplies at least the first offset output from the offset output module by the slope output from the first slope output module; and a first adder module that adds the multiplied first offset to the second color signal, the second adjunction module comprising:

a second slope output module that outputs a slope of a tangent to a 2.2th-power curve according to a tone value of the third color signal;

a second multiplier module that multiplies at least the second offset output from the offset output module by the slope output from the second slope output module; and a second adder module that adds the multiplied second offset to the third color signal.

4. An image display apparatus, comprising a color correction circuit in accordance with claim 3.

* * * * *